United States Patent
Lee et al.

(10) Patent No.: US 12,079,127 B2
(45) Date of Patent: Sep. 3, 2024

(54) SYSTEMS AND METHODS FOR RANDOM FILL CACHING AND PREFETCHING FOR SECURE CACHE MEMORIES

(71) Applicant: CoreSecure Technologies, LLC, Princeton, NJ (US)

(72) Inventors: Ruby B. Lee, Princeton, NJ (US); Fangfei Liu, Hillsboro, OR (US)

(73) Assignee: Coresecure Technologies, LLC, Princeton, NJ (US)

( * ) Notice: Subject to any disclaimer, the term of this patent is extended or adjusted under 35 U.S.C. 154(b) by 281 days.

(21) Appl. No.: 17/208,825

(22) Filed: Mar. 22, 2021

(65) Prior Publication Data
US 2021/0365590 A1    Nov. 25, 2021

Related U.S. Application Data

(62) Division of application No. 14/968,302, filed on Dec. 14, 2015, now Pat. No. 10,956,617.

(Continued)

(51) Int. Cl.
*G06F 12/08* (2016.01)
*G06F 12/0802* (2016.01)
(Continued)

(52) U.S. Cl.
CPC ...... *G06F 12/0862* (2013.01); *G06F 12/0802* (2013.01); *G06F 12/0868* (2013.01);
(Continued)

(58) Field of Classification Search
CPC ............ G06F 12/0862; G06F 12/0802; G06F 12/0868; G06F 12/14; G06F 2212/1052; G06F 2212/602
(Continued)

(56) References Cited

U.S. PATENT DOCUMENTS 6,324,632 B1   11/2001  McIntosh-Smith
10,956,617 B2   3/2021  Lee et al.
(Continued)

OTHER PUBLICATIONS

Wang, et al., "New Cache Designs for Thwarting Software Cache-Based Side Channel Attacks," in Proc. ACM/IEEE International Symposium on Computer Architecture (ISCA'07), 2007 (12 pages).
(Continued)

*Primary Examiner* — Hua J Song
(74) *Attorney, Agent, or Firm* — McCarter & English, LLP (57) ABSTRACT

Systems and methods for random fill caching and prefetching for secure cache memories are provided. The system dynamically de-correlates fetching a cache line to the processor from filling the cache with this cache line, due to a demand memory access, in order to provide greater security from information leakage due to cache side-channel attacks on cache memories. The system includes a random fill engine which includes a random number generator and an adjustable random fill window. Also provided is an adaptive random fill caching system which dynamically adapts the random fill window to a wide variety of computational workloads. Systems and methods for cache prefetching to improve system performance using adaptive random fill prefetching and random fill prefetching are also provided.

14 Claims, 12 Drawing Sheets

Related U.S. Application Data (60) Provisional application No. 62/090,968, filed on Dec. 12, 2014.

(51) Int. Cl.
   *G06F 12/0862* (2016.01)
   *G06F 12/0868* (2016.01)
   *G06F 12/14* (2006.01)

(52) U.S. Cl.
   CPC ...... *G06F 12/14* (2013.01); *G06F 2212/1052* (2013.01); *G06F 2212/602* (2013.01)

(58) Field of Classification Search
   USPC .......................................................... 711/118
   See application file for complete search history.

(56) References Cited

U.S. PATENT DOCUMENTS

| | | |
|---|---|---|
| 2001/0001873 A1 | 5/2001 | Wickeraad et al. |
| 2008/0133629 A1 | 6/2008 | Stribaek et al. |
| 2010/0180083 A1 | 7/2010 | Lee et al. |
| 2011/0113200 A1* | 5/2011 | Moses ................. G06F 12/0888 711/170 |
| 2012/0297110 A1 | 11/2012 | Kavi |
| 2012/0297127 A1 | 11/2012 | Belluomini et al. |
| 2014/0317356 A1* | 10/2014 | Srinivasan .......... G06F 12/0844 711/137 |
| 2015/0006864 A1* | 1/2015 | Chou .................... G06F 9/383 712/228 |
| 2015/0186280 A1* | 7/2015 | Lepak .................. G06F 12/121 711/136 |
| 2016/0170889 A1 | 6/2016 | Lee et al. |

OTHER PUBLICATIONS

Wang, et al., "A Novel Cache Architecture with Enhanced Performance and Security," in Proc. IEEE/ACM International Symposium on Microarchitecture (MICRO'08), 2008 (11 pages).

Kong, et al., "Hardware-Software Integrated Approaches to Defend Against Software Cache-Based Side Channel Attacks," in Proc. IEEE International Symposium on High Performance Computer Architecture (HPCA'09), 2009 (12 pages).

Domnitser, et al., "Non-Monopolizable Caches: Low-Complexity Mitigation of Cache Side Channel Attacks," ACM Transactions on Architecture and Code Optimization (TACO), vol. 8, Issue 4, Jan. 2012 (20 pages).

Liu, et al., "Random Fill Cache Architecture," to be presented at the 47th Annual IEEE/ACM International Symposium on Microarchitecture, Dec. 15, 2014 (13 pages).

Lee, et al., "Using Moving Target Defense for Secure Hardware Design" DHS PI meeting presentation Dec. 17, 2014, in the non-public Principal Investigators' part of the DHS S&T CSD Showcase and Technical Workshop, Dec. 16-18, 2014 (19 pages).

Liu, et al., "Adaptive Random Fill Option," Princeton University Department of Electrical Engineering Technical Report CE-L2014-003, Dec. 8, 2014 (4 pages).

Office Action mailed Oct. 29, 2018, issued in connection with U.S. Appl. No. 14/968,302 (8 pages).

Office Action mailed Jun. 5, 2019, issued in connection with U.S. Appl. No. 14/968,302 (8 pages).

Office Action mailed Feb. 21, 2020, issued in connection with U.S. Appl. No. 14/968,302 (10 pages).

Notice of Allowance mailed Nov. 10, 2020, issued in connection with U.S. Appl. No. 14/968,302 (11 pages).

\* cited by examiner

| Declaration | Description |
|---|---|
| set_RR(int a, int b) | set range register $RR_1$ and $RR_2$ to the given value $a$ and $b$, respectively |
| set_window(int lowerBound, int n) | set the lower bound and size of the random fill window to $lowerBound$ and $2^n$, respectively |

SYSTEMS AND METHODS FOR RANDOM FILL CACHING AND PREFETCHING FOR SECURE CACHE MEMORIES

RELATED APPLICATIONS

This application is a divisional application of U.S. application Ser. No. 14/968,302 filed on Mar. 23, 2021, which claims priority to U.S. Provisional Application Ser. No. 62/090,968 filed Dec. 12, 2014, the entire disclosures of which are expressly incorporated herein by reference.

GOVERNMENT RIGHTS

This invention was made with government support under Grant No. FA8750-12-2-0295 awarded by the Department of Homeland Security administered by the United States Air Force, AFMC, Air Force Research Laboratory and under Grant No. CNS-1218817 awarded by the National Science Foundation. Accordingly, the Government has certain rights to this invention.

FIELD OF THE INVENTION

The present invention relates to improvements in secure memories for computer processors. More specifically, the present invention relates to systems and methods for random cache filling and prefetching for secure cache memories.

RELATED ART

In the field of computer security, adequate protection of memories for computer processors, and in particular, cache memories, is paramount. Recent findings on cache side channel attacks have shown that correctly functioning caches may leak critical secrets like cryptographic keys, nullifying any protection provided by strong cryptography. These attacks are easy to perform and are effective on all platforms, from embedded systems to cloud servers, that use hardware caches. Therefore, future cache designs must take into account security, ideally without degrading performance and power efficiency.

In cache side channel attacks, an attacker exploits the large timing difference between cache hits and cache misses to infer the key-dependent (i.e., security-critical) memory addresses, and hence the secret information, during the execution of cryptographic programs. Previous efforts have investigated how to design secure caches to provide built-in defenses against cache side channel attacks. Examples include a partition-based approach that eliminates the cache contention, and a randomization-based approach that randomizes the cache contention. However, these approaches only target contention based attacks and are not effective in defeating reuse based attacks. There are also some efforts that try to achieve constant execution time by either not loading security-critical data into the cache at all, or trying to ensure all cache hits whenever security-critical data is accessed, by frequently preloading or reloading all security-critical data. Such an approach may potentially defeat the reuse based attacks, but at the cost of significant performance degradation, and sometimes enabling other types of attacks.

Accordingly, what would be desirable is a system which protects cache memory against reuse-based attacks, as a complement to existing secure cache design approaches. In particular, what is needed is a novel random fill cache architecture with a new security-aware cache fill strategy, which takes advantage of the random access pattern found in cryptographic algorithms, does not degrade performance, is more general and flexible than the demand fetch strategy, and even provides performance improvements for some types of applications. What would also be desirable is an adaptive random fill caching system with improved performance and applicability to a wide variety of computational workloads.

SUMMARY

The present disclosure relates to systems and methods for random fill caching for secure cache memories. The system dynamically de-correlates fetching a cache line to the processor from filling the cache with this cache line, due to a demand memory access, in order to provide greater security from information leakage due to cache side-channel attacks on cache memories.

The system includes a random fill engine which includes a random number generator and an adjustable random fill window. A random fill cache sends a plurality of requests to the next level of memory including a normal fill request, a "nofill" request, and a random fill request, to provide added security for the cache memory. In a "nofill" request, a demand missed cache line will not be filled in the cache. Instead, a randomly selected cache line within the neighborhood window of the demand missed cache line address will be filled into the cache, called a random fill request. The system also supports "normal" requests that use the conventional demand fill policy. Also provided is an adaptive random fill caching system which dynamically adapts the random fill window to a wide variety of computational workloads. Systems and methods for cache prefetching to improve system performance using adaptive random fill prefetching and random fill prefetching are also provided.

BRIEF DESCRIPTION OF THE DRAWINGS

The foregoing features of the invention will be apparent from the following Detailed Description, taken in connection with the accompanying drawings, in which:

FIGS. 8A-11 are diagrams illustrating performance of the random fill caching and adaptive random fill caching systems of the present disclosure.

DETAILED DESCRIPTION

The present disclosure relates to systems and methods for random cache filling for secure cache memories, as described in detail below in connection with FIGS. 1-11. Before describing the system of the present disclosure in detail, it is helpful to provide the following short description of technical terminology and associated background.

Processors typically incorporate multiple levels of cache memory between the fast processor and the much slower main memory, in order to achieve a short effective memory access time. Each level of cache memory, ending with the main memory, is larger and slower than the previous level. When the processor needs a memory word from a memory line that is not currently in the cache, a "demand fetch" request is made to the next level of cache memory (the last level of cache makes a request to main memory) which is larger than the current cache level. If the desired memory line is already in the cache (called a "cache hit"), the desired word in this line is just sent to the processor. If it is not in the cache (called a "cache miss" also called a "demand miss" in FIG. 1, described below), this demand fetch results in the requested line being brought into the cache (called "cache fill") potentially replacing another cache line, while also forwarding the desired memory word from this cache line to the processor. Reuse based cache side-channel attacks are attacks that can leak secret information like an encryption key due to a memory access hitting in the cache because it uses the same cache line used by an earlier memory access.

The system of the present disclosure is predicated on the key insight that the root cause of reuse based attacks suggests that the cache fill strategy has to be re-designed to de-correlate the cache fill and the memory fetch to the processor of a conventional demand memory access. Accordingly, the system of the present disclosure uses a random cache fill strategy to dynamically achieve this de-correlation. On a cache miss, the missing data is sent to the processor without filling the cache with the missing memory line. To still achieve good performance from the cache, the cache is filled with randomized fetches within a configurable neighborhood window of the missing memory line instead.

This approach is partially motivated by the observation that accesses to the security-critical data in cryptographic programs usually have random patterns, due to the nonlinearity of the lookup tables (e.g., S-box) and to the random keys. Therefore, randomly fetching the neighborhood memory lines is as good as demand fetching the missing memory line. The random fetching within the spatial locality of the neighboring memory locations is like prefetching, and hence performance may not be degraded, and could even be improved in some cases.

The random cache fill strategy of the system of the present disclosure represents a more general and flexible cache fill strategy than the demand fetch policy, and the degree of de-correlation can be configured by changing the random fill window size. As discussed below, the random cache fill strategy of the present disclosure can provide an information-theoretic security assurance against reuse based attacks by choosing a proper random fill window size. As a cache fill strategy, it can be built on any existing cache architecture to provide built-in security against reuse-based cache side channel attacks.

In the rest of this disclosure, the terms "random fill", "random fetch", "random prefetching" are used as synonymous terms. Similarly, the terms "demand fill" and "demand fetch" are used synonymously.

Figure 1:
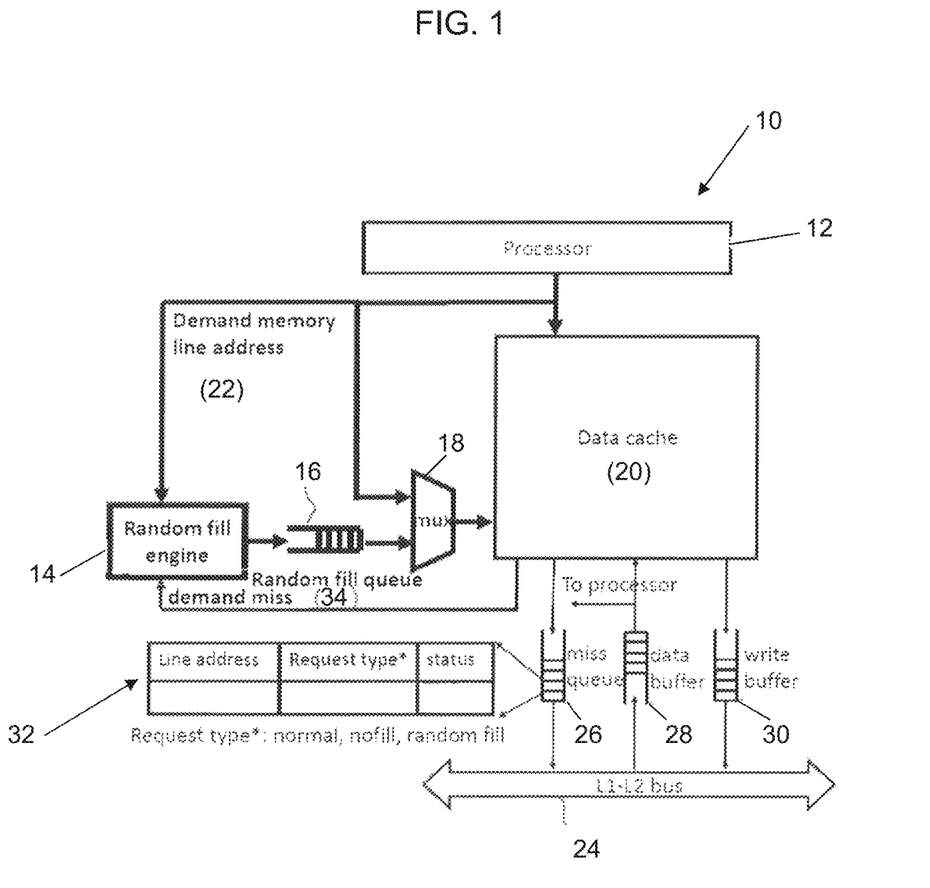
FIG. 1 is a block diagram illustrating the system of the present disclosure for random fill caching of secure cache memories.

Turning now to the drawings, FIG. 1 is a block diagram of the system for random fill caching of secure cache memories, indicated at 10. The system 10 includes a processor 12, a random fill engine 14, a random fill queue 16, a multiplexer 18, and a data cache 20. The random fill engine (discussed in greater detail below) processes demand memory line addresses 22 generated by the processor 12. A demand miss signal 34 is sent to the random fill engine 14 by the data cache 20. The data cache 20 is connected to a bus 24 via a "miss" queue 26, a data buffer 28, and a write buffer 30. It is noted that the system 10 has particular suitability for protecting against side-channel attacks in L1 (Level 1) data caches. The system could also be applied to L2 (Level 2) or L3 (Level 3) caches, if desired and if these additional cache levels are present. The system 10 is built upon a conventional non-blocking cache, and the hardware addition is very small (highlighted in bold in FIG. 1), including the random fill engine 14, the queue 16 and the multiplexer 18, which can be added to the cache controller for cache 20. The system 10 is also called a processor core, including the processor 12 and its associated L1 caches 20.

In a non-blocking and write-back cache, an entry in the miss queue 26 records the missing memory line address and the status of the request as entries 32 in the queue 26. A field is added to miss queue entries to indicate the request type: normal, nofill or random fill:

Normal request is a demand fetch as in a conventional cache that does demand fill; it fills the cache 20 with the missing line, and the data returned will be sent to the processor 12.

Nofill request is a demand memory access that directly forwards returned data to the processor 12 while not filling the cache 20. This leverages the critical word first technique typically implemented to reduce the cache miss latency, so no extra hardware is required to implement the forwarding of data.

Random fill request only fills the cache 20 but does not send any data to the processor 12.

Figure 2:
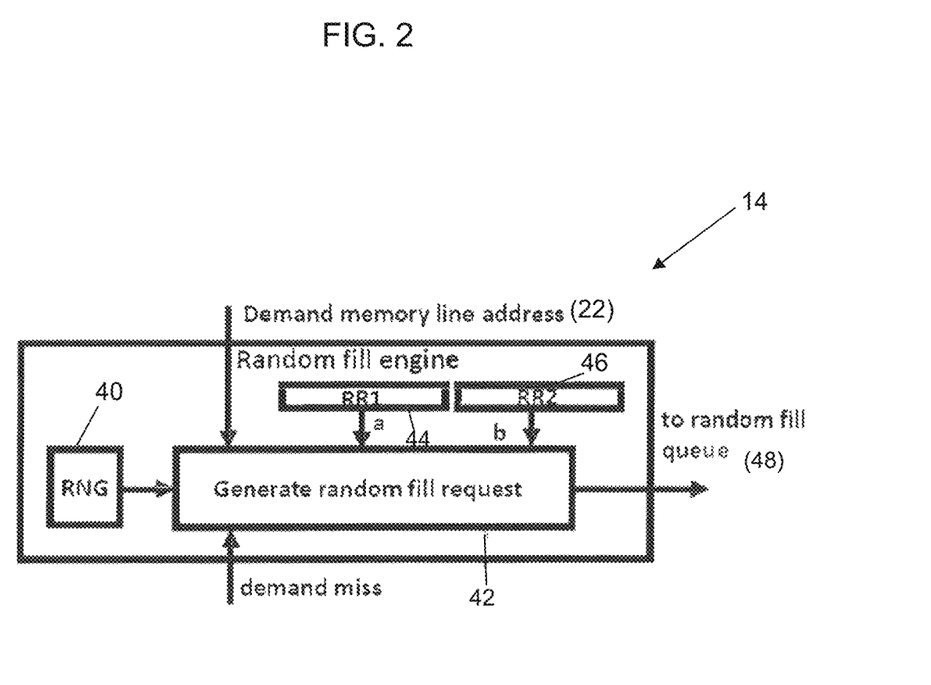
FIGS. 2-3 are block diagrams illustrating the random fill engine of FIG. 1 in greater detail.

FIG. 2 is a block diagram illustrating components of the random fill engine 14 in greater detail. The random fill engine 14 is a hardware component that can be implemented in a cache controller of the cache memory 20 of the processor 12. Upon a cache miss, the demand requested memory line will not be filled into the cache 20. Instead, the random fill engine 14 generates a random fill request 42 that is transmitted via output 48 to the random fill queue 16 with an address within a neighborhood window, shown here as [i−a, i+b] which is a memory lines before and b memory lines after the demand request for memory line i. The two boundaries a and b are stored in two new range registers, RR1 (element 44) and RR2 (element 46), which bound the range of the random number generated from a free running random number generator (RNG) 40. For example, the RNG 40 can be implemented as a pseudo random number generator with a truly random seed. The use of RNG 40 does not impact the cycle time since it is used only during a cache miss and hence is not in the critical path of the processor's pipeline. Furthermore, the random number can be generated ahead of time and buffered. Note that when the range registers 44, 46 are set to zero, randomized cache fill is essentially disabled. In this case, the demand request will be sent as a normal request and no random fill request is generated. The random fill request goes to the random fill queue 16 (a First In First Out (FIFO) buffer) where it waits for idle cycles to lookup the tag array of the data cache 20. If the random fill request 42 hits in the cache 20, it is dropped. Otherwise, a random fill request is issued and put into the miss queue 26.

Figure 3:
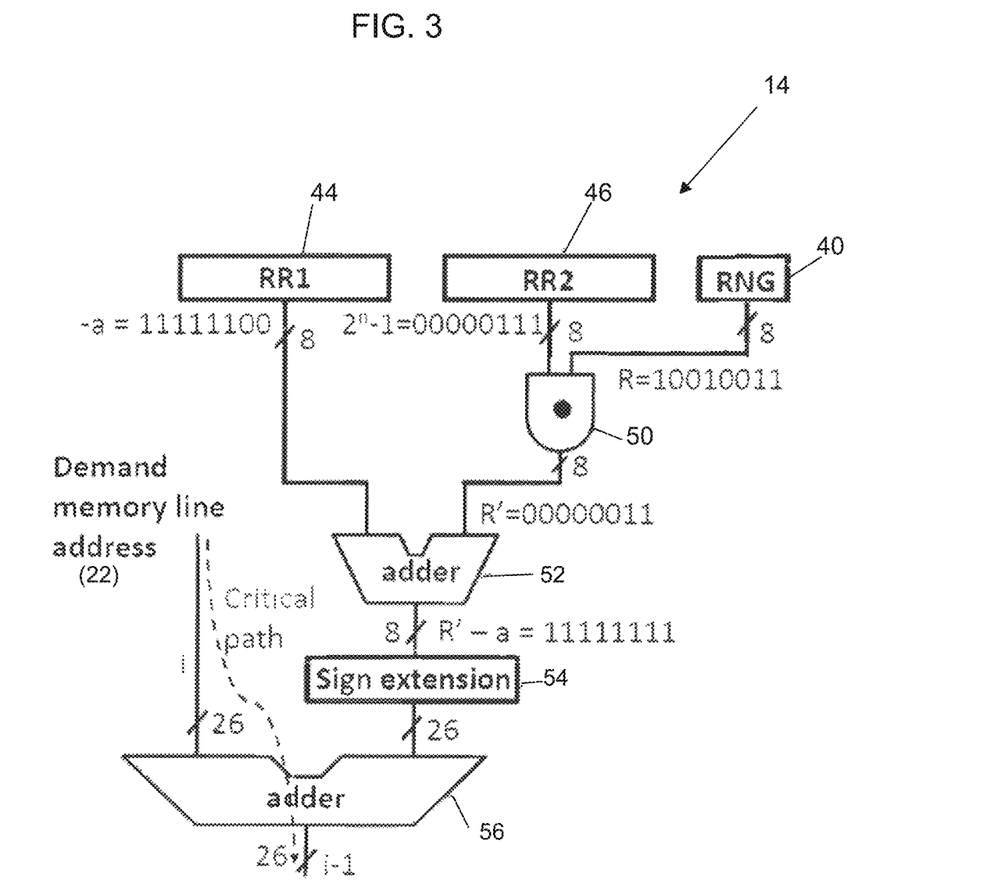

FIG. 3 is a block diagram illustrating hardware components of the random fill engine 14 in greater detail. The range register 46 (RR2) and the random number generator 40 are connected to a logical AND circuit 50. The output of the logical AND circuit 50 and the range register 44 (RR1) are connected to an adder 52. The output of the adder 52 is connected to a sign extension circuit 54, and the output of the sign extension circuit 54 and the demand memory line address 22 are added together by an adder 56 to generate the random fill request. The example shows a random fill window [i−4, i+3]. RR1 stores the lower bound −a and RR2 stores the window size mask $2^3-1$. Both the range registers and RNG 40 are 8-bits in width, and the generated random fill request is i−1.

Figure 4:
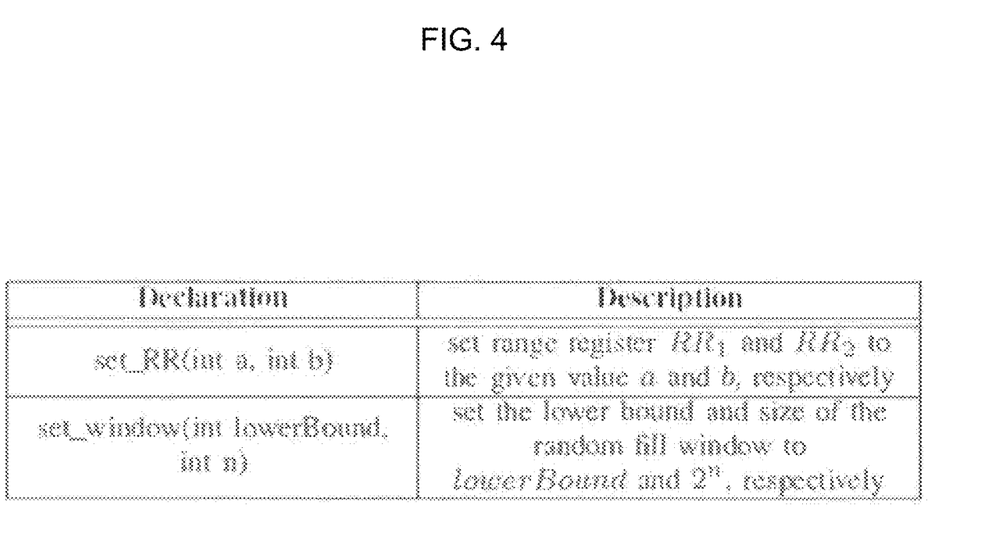
FIG. 4 is a table illustrating operating system (OS) declarations for use in connection with the system of FIGS. 1-3, as well as corresponding descriptions of those declarations.

FIG. 4 is a table illustrating operating system (OS) calls (instructions) for configuring the random fill window of the system dynamically. It is noted that only 1 call is needed to configure the random fill window. The two range registers, RR1 and RR2, are configurable by the OS. As shown in FIG. 4, the OS provides a system call set_RR to set the range registers by the compiler and/or applications. This system call provides a fine-granularity control of the use of the random fill cache. By default, the two range registers are set to zero and the random fill cache works just like the conventional demand-fetch cache. The system call can be inserted before the cryptographic operations either by the compiler or by the applications to enable randomized cache fill. They can be disabled afterwards by another call to set_RR. The range registers are part of the context of the processor and need to be saved to, and restored from, the process control block (PCB) for a context switch.

Since it may be non-trivial to generate a random number within an arbitrary bound, also provided is an optimization that constrains bounds a and b so that a+b+1=2n, i.e., the window size is a power of two. Instead of set_RR, a different system call set_window is implemented: this takes the lower bound of the random fill window (i.e., −a) and the logarithm of the window size (i.e., n) as parameters. Instead of directly storing a and b, the range registers store the lower bound −a and a mask for the window (i.e., $2^n-1$), as shown in FIG. 3. The masked random number is R'=3, which when added to the lower bound −4 gives the bounded random number −1. Since the bounded random number can be computed ahead of time, the critical path only consists of one adder that adds the demand memory line address i and the bounded random number (as shown by the dotted arrow in FIG. 3).

Reuse-based attacks consist of cache collision attacks and Flush-Reload attacks, which correspond to two information leakage channels: the timing channel and the storage channel. By definition, the timing channel exploits the timing characteristics of events to transfer information, whereas the storage channel transfers information through the setting of bits by one program and the reading of those bits by another. The random cache fill strategy of the system of the present disclosure is able to completely close the known timing channel and provide a strong information-theoretic security assurance against the storage channel, when the random fill window of the victim process is properly chosen.

Although the random fill cache of the present disclosure is proposed for security, it also provides architectural support for a more flexible and general cache fill strategy than the demand fetch policy. For example, non-cryptographic programs can benefit from the random cache fill strategy to improve performance. The performance implication of random fill caching of the present disclosure is that it can take advantage of spatial locality beyond a cache line, while the demand fetch strategy can only take advantage of spatial locality within a cache line. In particular, it has been observed that the random fill cache of the present disclosure can improve performance for streaming applications like "libquantum" and "lbm" as discussed in greater detail below in connection with FIGS. 8A, 8B and 9.

The random fill cache of the present disclosure provides architectural support for a security-critical program to protect itself against reuse based attacks, by properly configuring its own random fill window size. A random fill cache hardly incurs any performance degradation, and can sometimes even improve the performance of programs that have irregular streaming patterns. The hardware addition is very small, and only the cache controller needs to be changed slightly. Also, only trivial software changes are required: to set the window size at the beginning of the cryptographic routine or the security-critical or streaming program.

Reuse-based cache side channel attacks are serious new sources of information leakage in the microprocessor, in addition to the better-known contention based side channel attacks. They do not rely on any resource contention and are threats especially relevant to storage structures (like caches and TLBs) which exploit the locality of data accesses to store data from larger storage structures. The fundamental demand fetch policy in conventional caches is the security vulnerability that causes the success of reuse based attacks. The random fill cache architecture of the present disclosure is able to dynamically de-correlate the cache fill with the demand memory access. The random fill cache provides information-theoretic security against reuse based attacks, results in very slight performance degradation for cryptographic algorithms, and has no performance impact on concurrent non-security-critical programs. The random fill strategy disclosed herein can be built on conventional caches to defend against reuse-based attacks. If it is built on secure cache designs that protect against contention-based side-channel attacks, then the resulting cache can provide comprehensive defenses against all known cache side channel attacks—without degrading performance. Furthermore, the random fill cache provides a more general cache fill strategy than the demand fetch strategy, and can be used as a prefetching strategy to provide performance benefit to some applications that are not demand-fetch amenable, by exploiting spatial locality beyond a cache line.

Other embodiments of the random fill policy and how the neighborhood window is defined and implemented are also possible. These embodiments are discussed below. Further, it is noted that the random fill cache disclosed in accordance with the present invention can be adaptive in nature. Such an implementation will now be discussed in connection with FIGS. 5-11.

In order to improve the performance of a random fill cache for a wide variety of workloads, an adaptive random fill cache architecture is provided that can dynamically adjust the random fill window according to the spatial locality of access patterns. Therefore, accesses with wide spatial locality use a large window size, and accesses with narrow spatial locality use a small window size or disable the random fill mechanism. Cryptographic algorithms with security-critical data accesses to tables will have wide spatial locality and will use a wide window. This wide window will provide good security from cache side-channel information leakage. Similarly, streaming programs have wide spatial locality and their performance will benefit from fetching from a wide window. Other programs with narrow spatial locality will quickly adapt to a small window size, thus not sacrificing performance. This is all done automatically by the hardware, without the need to change software programs or trust the OS to make this determination of window size.

The first design issue is how to capture the spatial locality of a program using the random fill window. Past work on spatial locality has shown that there are large spatial variations in cache line usage both within and across a program. To capture the variations in spatial locality, the memory address space is divided into fixed-sized spatial regions. A spatial region consists of multiple consecutive memory blocks and accesses to the spatial region are correlated. The spatial correlation may span large regions on the order of a page size. Spatially-correlated access patterns are monitored in connection with a spatial region and to predict future accesses using these patterns.

Inspired by the use of spatial regions for correlating memory accesses, each spatial region is assigned a different window size and adjust the window size by monitoring accesses to each spatial region. The learning strategy is called "try-and-learn." An initial miss to a spatial region will be handled by random fill with a default large window size. If the spatial region has lots of correlated accesses (i.e., large spatial locality), a large window size may work well and the system can try a larger window size or keep using this window size if it is already the largest one (for security reasons, a larger window size is desired); otherwise, the system will try a smaller window size. In this way, the random fetch window can faithfully track the spatial locality in a spatial region.

Figure 5:
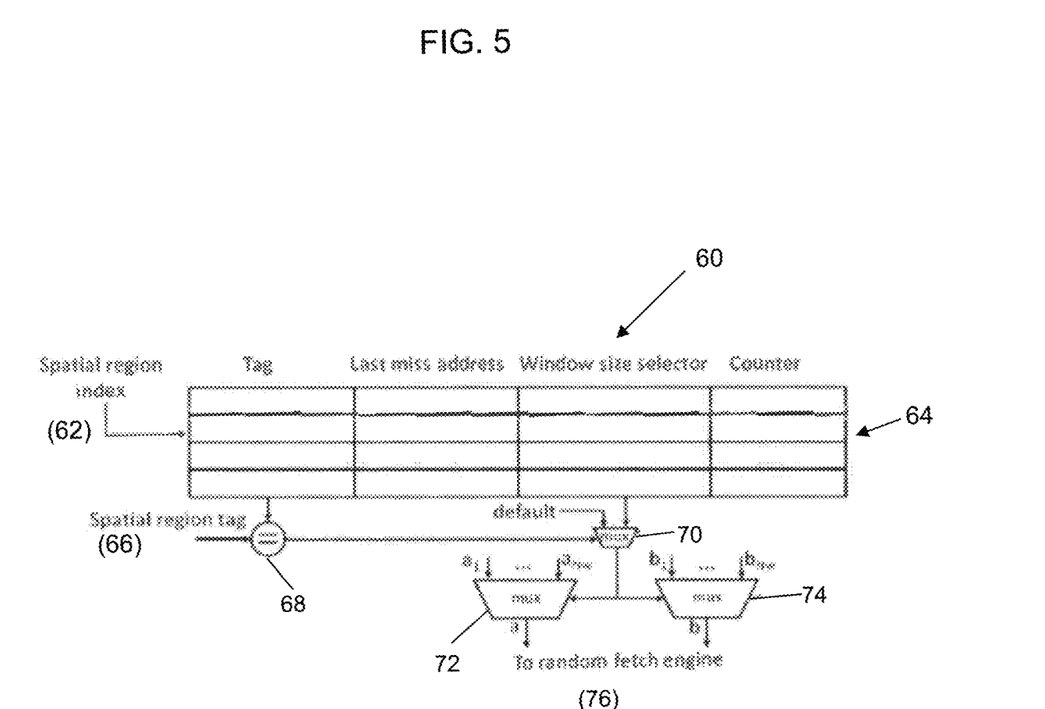
FIG. 5 is a block diagram illustrating another embodiment of the system of the present disclosure, wherein adaptive random fill caching is provided with a window size generator.

The adaptive random fill caching system of the present disclosure has the same overall architecture as in FIG. 1, except that the two range registers 44, 46 (RR1 and RR2) in FIG. 2 are replaced by the adaptive random fill window size generator 60 shown in FIG. 5. Referring to FIG. 5, the adaptive random fill window size generator 60 includes a spatial region monitor table 64 and decoding logic (which includes circuit components 68, 70, 72, and 74). The spatial region monitor table 64 does not store the two ranges a and b directly, instead it only stores a window size selector, which is decoded by the decoding logic to select from a small set of $N_w$ predefined range pairs: $[a_1, b_1]$, $[a_2, b_2]$, $[a_{N_w}, b_{N_w}]$. These window sizes are ordered with the smallest window size being $[a_1, b_1]$ selected by a window size selector (described later in FIGS. 7(*a*) and (*b*)) having a value of 1, and the largest window size being $[a_{N_w}, b_{N_w}]$ selected by a window size selector having a value of $N_w$.

Ideally, the spatial region monitor table 64 should contain as many entries as the number of spatial regions, which may cause too much area overhead. Therefore, the spatial region monitor table 64 only has limited number of entries, and only stores information for the recently referenced spatial regions, in a similar way as a direct-mapped cache.

Figure 6:
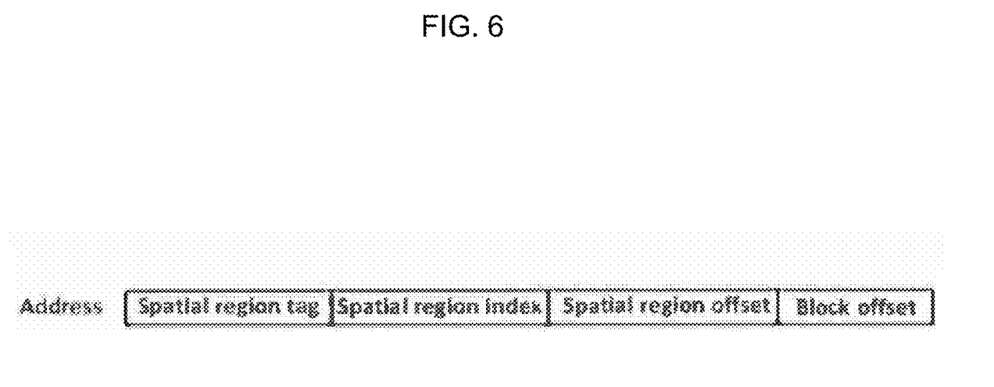
FIG. 6 is a diagram illustrating a sample cache memory address format in connection with the system of FIG. 5.

Referring to FIG. 6, the memory address consists of spatial region tag, spatial region index, spatial region offset and block offset. The spatial region index is used to index the spatial region monitor table 64. The tag field is compared with the tag bits in the address to identify a specific spatial region. If the tag field matches, it can use the window size information in that entry, otherwise it needs to use a default window size, and replace the window size information with the new spatial region. Other information that can be stored in the spatial region monitor table include auxiliary information in order to determine whether a random fill window is working well, or not, for a spatial region.

Figure 7:
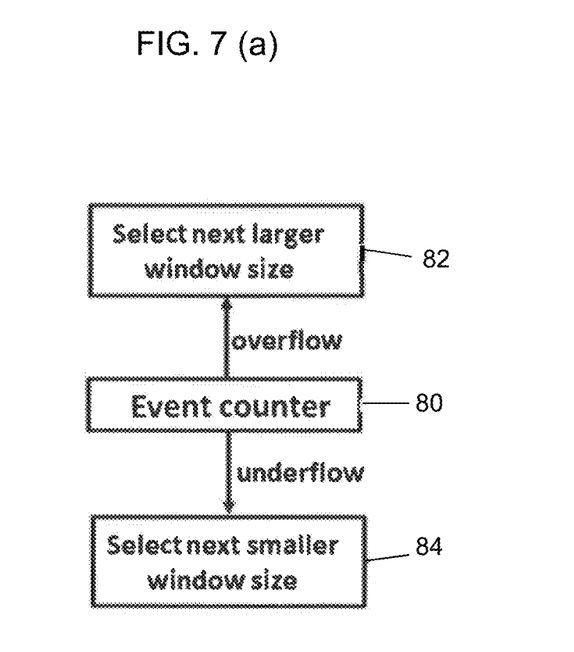
FIG. 7(a) is a flow diagram illustrating how the adaptive random fill caching system of FIGS. 5-6 selects a next window size based on counter overflow or underflow.
FIG. 7(b) is a diagram illustrating one embodiment of how the window size selector and event counter can be implemented.

The method for selecting a window size is shown in FIG. 7(*a*). Shown is an event counter 80 that counts up for events that suggest that a larger window size should be used, and counts down for events indicating that a smaller window size should be used. The window size is only changed when this event counter overflows or underflows. On overflow of the event counter, the next larger window size is selected (indicated by block 82), while on underflow, the next smaller window size is selected (indicated by block 84). An embodiment of the window size selector and the event counter (indicated together as 90) is shown in FIG. 7(*b*). In the embodiment shown in FIG. 7(*b*), the window size selector 92 and the event counter 94 are implemented together as a saturating counter. The window size selector is incremented by 1 when the event counter 94 overflows and is decremented by 1 when the event counter underflows. If a smaller window size selector corresponds to a smaller window size, then the window size selector concatenated with the event counter is equivalent to a large saturating counter. For example, assume the window size selector has 3 bits and counts from 0, 1, . . . , 7, which selects a random fill window from [0,0], [0,1], . . . , [0,7], respectively. Similarly, assume the event counter also has 3 bits and counts from 0 to 7. The concanentation of the window size selector and event counter is equivalent to a 6-bit counter. Consider the following two cases:

1) The current window size selector is 011 and the event counter is 000. Therefore, the corresponding random fill window is [0,3]. The event counter detects an event that decrements and hence underflows the event counter. Then the window size selector becomes 010 and the event counter becomes 111. A smaller random fill window [0,2] is selected.
2) The current window size selector is 010 and the event counter is 111. Therefore, the corresponding random fill window is [0,2]. The event counter detects an event that increments and hence overflows the event counter. Then the window size selector becomes 011 and the event counter becomes 000. A larger random fill window [0,3] is selected.

Described below are events that increment or decrement the event counter shown in FIG. 7(*a*) and FIG. 7(*b*):

1) Successive misses to the same memory block: this indicates that the random fill cache does not work well. A random fill cache may degrade performance when it causes extra misses that will not have happened if a demand requested memory block is brought into the cache. Ideally, we need to record a stream of miss addresses to each spatial region to capture this event. As an approximation, we only record the last miss address to a spatial region and monitor the events of successive misses to this memory block. This event decrements the counter in the event monitor.
2) A random fetched block is used: this indicates that the random fill cache works well. This event increments the counter in the event monitor.

Note that the system only counts the event when a random fetched block is referenced for the first time instead of counting every reference to the random fetched block. This is because the number of references to random fetched blocks is on the order of the number of cache hits, while the number of successive misses to the same memory block is on the order of the number of cache misses. This would unfairly favor incrementing the counter since there are more cache hits than cache misses.

For security reasons, a third event is also monitored, i.e., whether:

3) a used random fetched block is evicted. This event may indicate that an attacker is trying to trigger a new measurement by flushing/evicting the cache, in which case a large window size for the spatial region containing security-critical data is desired. Hence, this event increments the event counter, and thus will increase the window size after a few evictions.

In order to determine whether a random fetched block is used, two bits are added in the cache tag array: random fetch bit and reference bit. The random fetch bit is set when a random fetched block is filled into the cache. The reference bit is set whenever the cache line is referenced. Note that a conventional cache with LRU replacement algorithm already has a reference bit for each cache line that we can leverage for our purpose.

The following algorithm illustrates how the window size is determined adaptively at run time and how the spatial region monitor table is updated, based on the three events described earlier:

```
Algorithm 1: Access Spatial Region Monitor Table
1   for each cache miss do
2   |   if found in the spatial region monitor table then
3   |   |   read out window size selector
4   |   |   if miss address = last miss address then
5   |   |   |   decrement counter
    |   |   L
6   |   |   else
7   |   |   |   update last miss address
    |   |   L
    |   L
8   |   else
9   |   |   use default window size selector
10  |   |   replace the conflicting spatial region entry
11  |   |   reset counter and selector to initial values
12  |   |   record miss address
    |   L
    L
13  for each cache hit do
14  |   if random fetch bit = 1 && reference bit = 0 then
15  |   |   if found in the spatial region monitor table then
16  |   |   |   increment counter
    |   |   L
    |   L
    L
17  for each eviction of a cache line do
18  |   if random fetch bit = 1 && reference bit = 1 then
19  |   |   if found in the spatial region monitor table then
20  |   |   |   increment counter
    |   |   L
    |   L
    L
21  return
```

Upon a cache miss (Lines 1 to 12 in Algorithm 1), the spatial region monitor table 64 is looked up to get the window size selector. At the same time, if the current miss address is the same as the last miss address, the event counter is decremented. If the spatial region is not found in the spatial region monitor table, a default window size selector will be used and the new spatial region will replace the conflicting spatial region (same spatial region index, different tag) for this entry in the spatial region monitor table. The lookup of the window size can be done in parallel with the reading of the miss queue and will not increase the miss penalty.

Upon a cache hit (Lines 13 to 16 of Algorithm 1), the random fetch bit and the reference bit of the cache tag array are checked. A random fetched cache line is first referenced when the random fetch bit is set while the reference bit is not set. This event will increment the counter. Incrementing the counter only on first access to a random fetched cache line has the additional benefit that the number of accesses to the spatial region monitor table is significantly reduced. Upon an eviction of a cache line (Lines 17 to 20 of Algorithm 1), if the evicted cache line is a random fetched block that has been used, the event counter will be incremented.

Figure 8A:
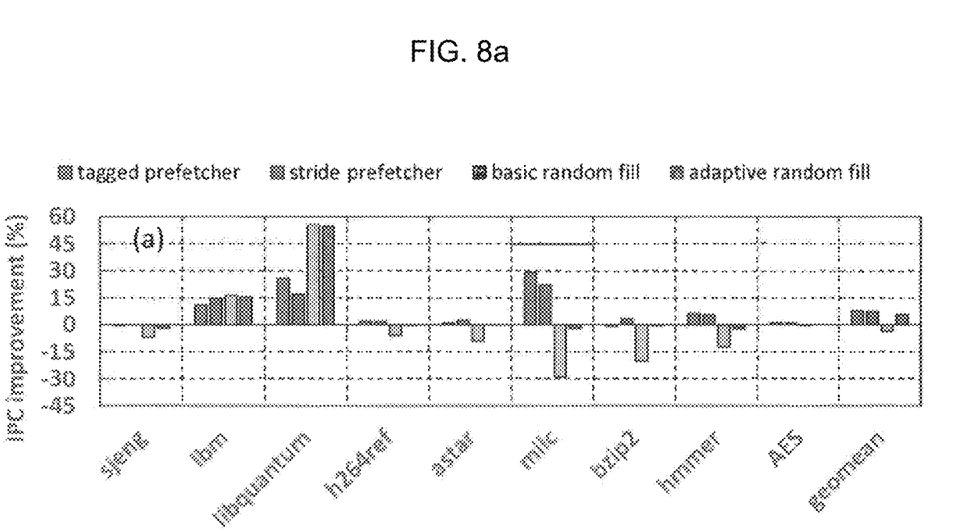
Figure 8B:
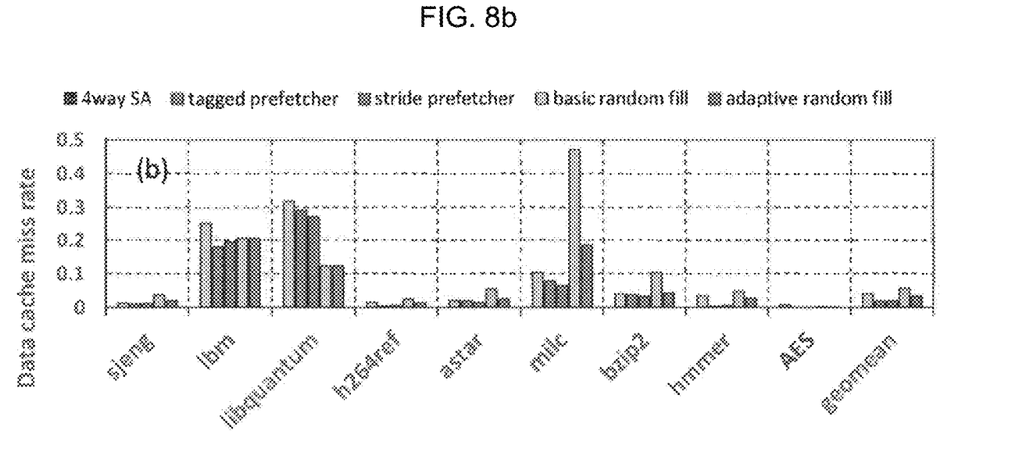
Figure 9:
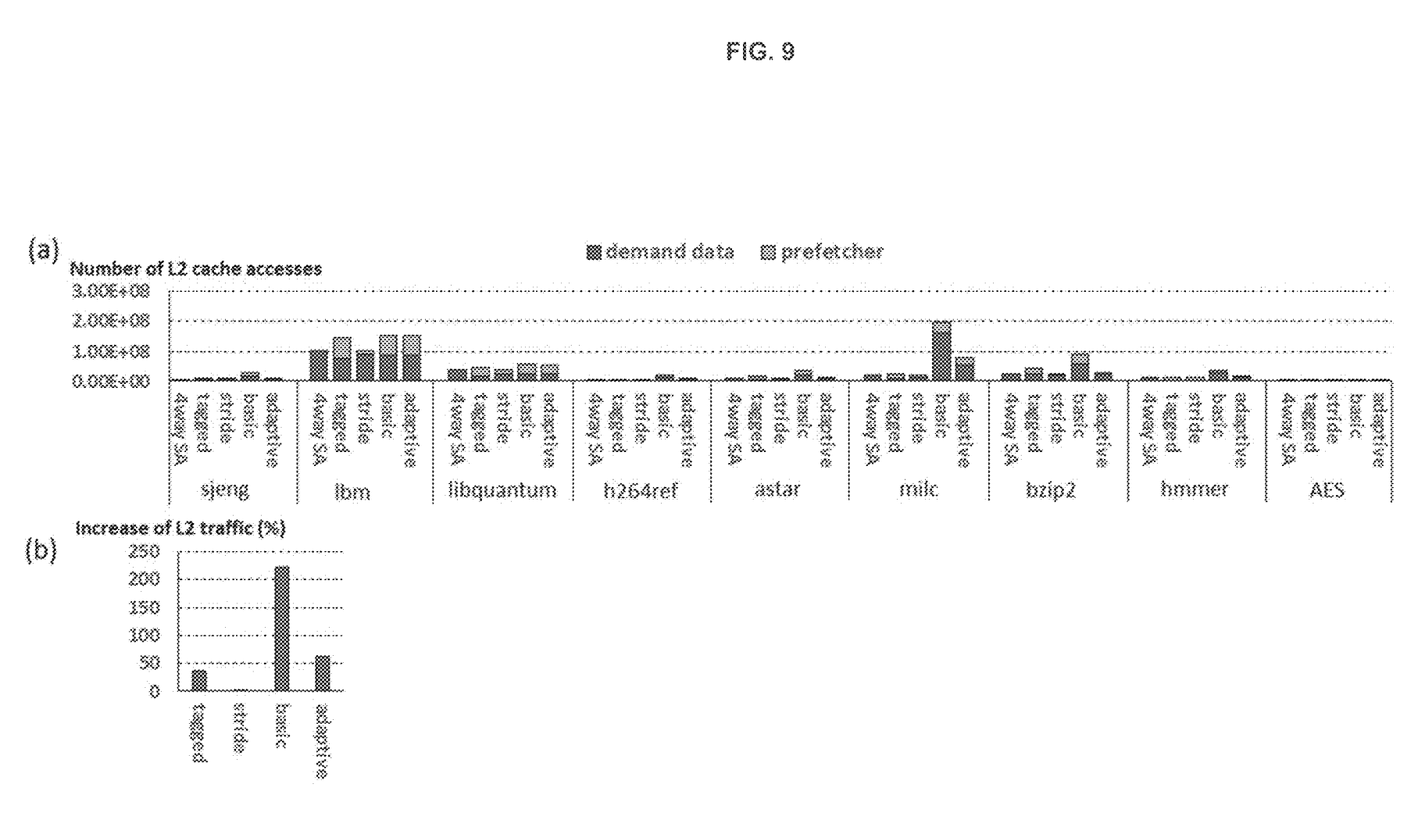

FIGS. 8A-8B and 9 show the benefit of the adaptive random fill policy as a cache prefetching policy. A pretching policy predicts what memory addresses will be referenced in the near future, and then "prefetches" them into the cache in advance of the memory addresses actually being asked for. There are various prefetching policies proposed or used in the commercial processors. The simplest and most commonly used prefetchers are a tagged prefetcher and a stride prefetcher. The tagged prefetcher prefetches cache line b+1 when cache line b is demand-fetched or a prefetched cache line is referenced for the first time (indicated by a tag bit associated with the prefetched cache line). The stride prefetcher identifies the regular access patterns with fixed stride d with respect to the previous access, for a given instruction. It prefetches cache line b+d when cache line b is demand-fetched. There are more complicated prefetchers such as a "global history buffer" prefetcher, which predicates which cache line to prefetch using prior global miss addresses stored in a global history buffer. Both the basic random fill cache and adaptive random fill cache are also useful for prefetching, not just for security. FIGS. 8A-8B and FIG. 9 show that they can achieve comparable performance as a tagged prefetcher or a stride prefetcher.

FIGS. 8A-11 illustrate various performance aspects of the random fill caching and adaptive random fill caching systems disclosed herein. It can be seen that the adaptive random fill cache discussed in connection with FIGS. 5-7 maintains as good performance for programs with wide spatial locality as the basic random fill cache discussed above in connection with FIGS. 1-4, while significantly reducing the performance degradation for other programs. The largest IPC performance improvement is 55% (libquantum) while the largest performance degradation is only 2.2% (milc). The huge performance improvement for the benchmarks with streaming patterns comes from the significant reduction (up to 61% for libquantum) of the data cache miss rate, which is very high in a conventional cache. It is notable that the adaptive cache fill policy used as a prefetcher can also reduce the miss rate for some benchmarks without wide spatial locality (e.g., h264ref, hmmer), but the performance is slightly degraded due to increased traffic to the L2 cache. Overall, the adaptive random fill cache prefetcher improves IPC performance by 5.8% over the conventional 4-way SA (Set Associative) cache, which is only slightly lower than that of a 4-way SA cache with a good prefetcher (7.8% for the tagged prefetcher and 7.3% for the stride prefetcher).

Impact on L2 cache bandwidth: Since the demand request does not fill the cache, random fill cache may impact the L2 cache bandwidth due to the increased L2 traffic. It can be seen from FIG. 9 that the adaptive random fill cache is also effective in reducing L2 bandwidth requirement compared with the basic random fill cache. The bottom graph (b) in FIG. 9 shows that the L2 traffic overhead (compared with the baseline 4-way SA cache without a prefetcher) is reduced from 222% to 62%. The 4-way SA cache with a stride prefetcher has the least impact to the L2 bandwidth (traffic is increased by 1.4%) while the tagged prefetcher also increases the traffic by 37%.

Figure 10:
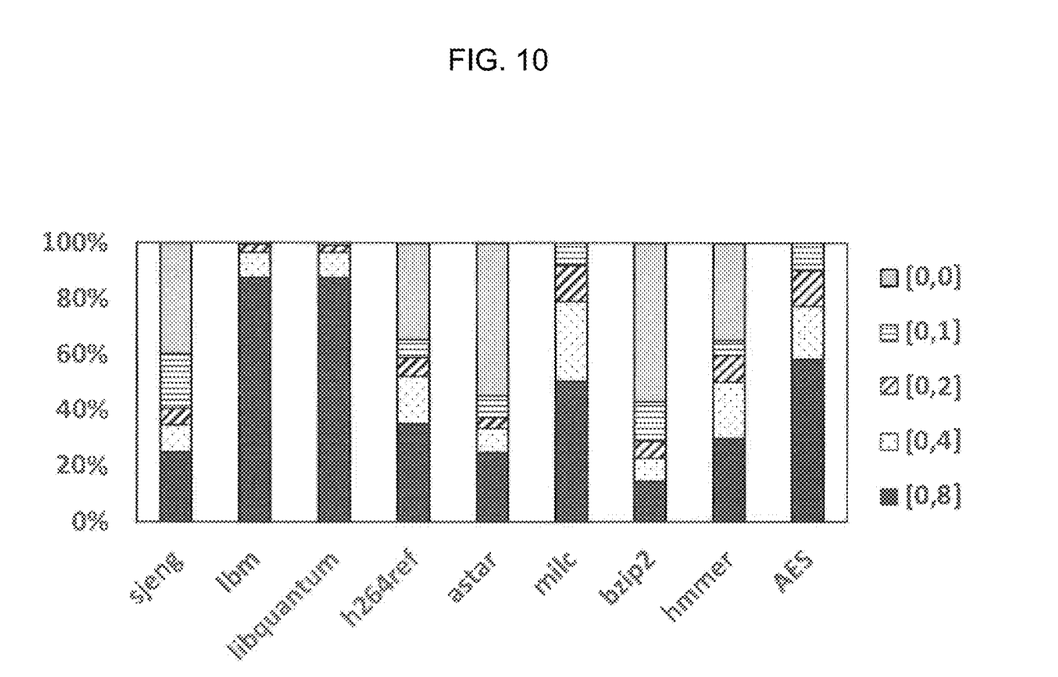

Distribution of random fetch window: FIG. 10 illustrates that for the programs with wide spatial locality, they tend to keep using the largest default window (e.g., >85% for libquantum and lbm); while for other programs where random fill does not work well, they quickly learn to disable the random fill, i.e., use the zero window size. For example, the distribution of zero window size is more than 50% in bzip2 and astar.

Figure 11:
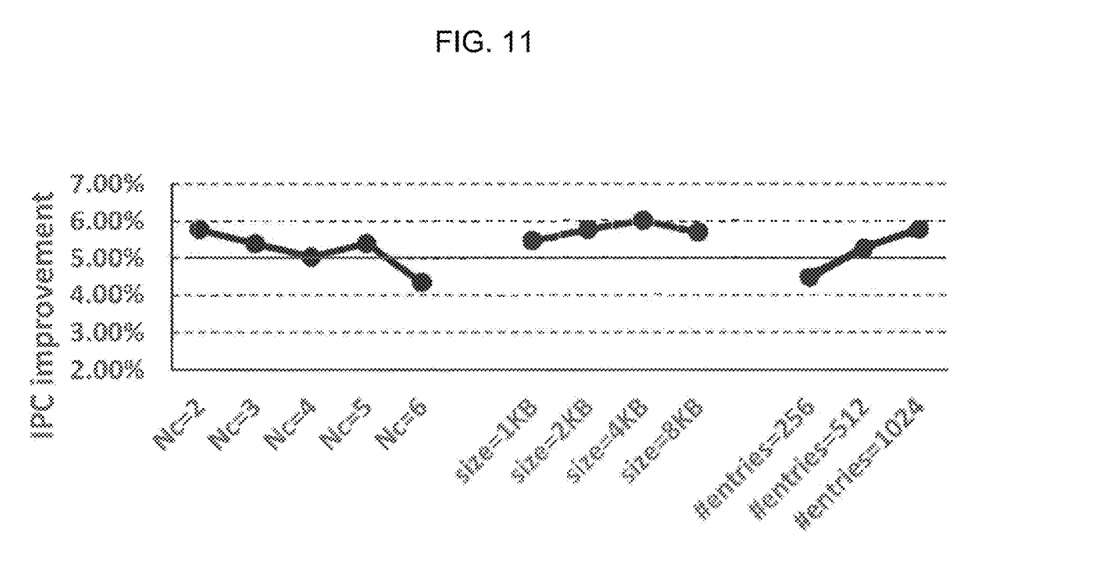

Sensitivity study: FIG. 11 illustrates that generally, performance is degraded when the number of counter states $N_c$ is increased since it takes a longer time for the window size selector to reduce the window size if a large window size does not work well. The only exception is when $N_c$=5, which works as well as $N_c$=3. It has been found that a spatial region size of 4 KB (the number of table entries are fixed at 1024) achieves the best performance. Also, a larger spatial region monitor table (more entries) works better due to reduced conflicts of spatial regions—but a table with 512 entries already has very good performance.

Hardware overhead: The hardware overhead of the basic random fill cache is very small, and the main hardware overhead of the adaptive random fill cache is the spatial region monitor table. To generate the performance results illustrated in FIGS. 8A-11, each table entry is 24 bits (3-bit window size selector, 1-bit counter, 5-bit last miss address and 15-bit tag), the overhead is 0.75 KB, 1.5 KB, and 3 KB for the spatial region monitor table with 256 entries, 512 entries and 1024 entries, respectively. The overhead is comparable to the stride prefetcher.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by letters patent is set forth in the appended claims.

What is claimed is:

1. A system for prefetching for a cache memory, comprising:
    a processor coupled to a cache memory; and
    a random fill engine coupled to the processor and the cache memory,
    wherein the random fill engine randomly fills a line of the cache memory with a memory line having an address that is a random number generated by the random fill engine within a range bounded by first and second range values, prior to accessing of the line by the processor.

2. The system of claim 1, further comprising a random fill queue coupled to the random fill engine and a multiplexer coupled to the random fill queue, the multiplexer multiplexing a demand memory line address issued by the processor with output from the random fill queue to generate a random cache fill request for use in filling the cache memory.

3. The system of claim 1, wherein the random fill engine comprises a random number generator and two range registers, and the random fill engine generates a random fill window for filling the cache memory which is bounded at least in part by data stored in the two range registers.

4. The system of claim 1, wherein the system processes a "normal" request, the normal request causing the system to fill the cache memory with a missing line and to transmit data returned from the cache memory to the processor.

5. The system of claim 1, wherein the system processes a "random fill" request, the random fill request causing the system to fill only the cache memory but not send any data to the processor.

6. The system of claim 5, wherein the random fill request is generated on a cache miss on the demand memory access.

7. The system of claim 5, wherein the random fill request is generated independently of the demand memory access.

8. A method for prefetching for a cache memory, comprising the steps of:
    coupling a random fill engine to a processor and to a cache memory; and
    randomly filling a line of the cache memory using the random fill engine with a memory line having an address that is a random number generated by the random fill engine within a range bounded by first and second range values, prior to accessing of the line by the processor.

9. The method of claim 8, further comprising multiplexing a demand fetch line address issued by the processor with output from a random fill queue coupled to the random fill engine to generate a random cache fill request for use in filling the cache memory.

10. The method of claim 8, further comprising generating a random fill window for filling the cache memory using the random fill engine, the window being bounded at least in part by data stored in two range registers of the random fill engine.

11. The method of claim 8, further comprising processing a "normal" request, the normal request causing the cache memory to be filled with a missing line and data returned from the cache memory to be transmitted to the processor.

12. The method of claim 8, further comprising processing a "random fill" request, the random fill request causing the cache memory to be filled but not send any data to the processor.

13. The method of claim 12, wherein the random fill request is generated on a cache miss on the demand memory access.

14. The method of claim 12, wherein the random fill request is generated independently of the demand memory access.

* * * * *